US009016591B2

(12) United States Patent
Herslow et al.

(10) Patent No.: US 9,016,591 B2
(45) Date of Patent: Apr. 28, 2015

(54) PLASTIC CARDS WITH HIGH DENSITY PARTICLES

(71) Applicants: John Herslow, Scotch Plains, NJ (US); Bradley A. Paulson, Northfield, MN (US); David Finn, Tourmakeady (IE)

(72) Inventors: John Herslow, Scotch Plains, NJ (US); Bradley A. Paulson, Northfield, MN (US); David Finn, Tourmakeady (IE)

(73) Assignee: Composecure, LLC, Somerset, NJ (US)

( * ) Notice: Subject to any disclaimer, the term of this patent is extended or adjusted under 35 U.S.C. 154(b) by 0 days.

(21) Appl. No.: 13/962,925

(22) Filed: Aug. 8, 2013

(65) Prior Publication Data

US 2015/0041546 A1 Feb. 12, 2015

(51) Int. Cl.
G06K 19/06 (2006.01)
G06K 19/02 (2006.01)
G06K 19/08 (2006.01)

(52) U.S. Cl.
CPC .............. G06K 19/02 (2013.01); G06K 19/083 (2013.01)

(58) Field of Classification Search
USPC .................................. 235/487, 488, 492, 494
See application file for complete search history.

(56) References Cited

U.S. PATENT DOCUMENTS

| 4,899,039 | A | * | 2/1990 | Taylor et al. | 250/208.2 |
| 4,917,292 | A | * | 4/1990 | Drexler | 235/488 |
| 5,698,839 | A | * | 12/1997 | Jagielinski et al. | 235/493 |
| 2006/0071084 | A1 | * | 4/2006 | Detig et al. | 235/492 |
| 2009/0294543 | A1 | * | 12/2009 | Varga et al. | 235/492 |

* cited by examiner

*Primary Examiner* — Daniel St Cyr
(74) *Attorney, Agent, or Firm* — Henry I. Schanzer

(57) ABSTRACT

High density metal or mineral particles, sized to be less than 10 microns, are compounded into a base plastic layer to form a compounded composite layer used to form the core layer of the card, any layer of the card or the entire card. The amount of high density particles compounded into the plastic layer is controlled so the card: (a) is at least twice as heavy as any standard PVC card; (b) can be manufactured using standard current plastic card equipment and tooling. (c) is not brittle; and (d) is electrically non-conductive whereby it is not subject to electrostatic discharge properties. The card can include RFID functionality integrated into the card body. The compounded composite layer does not interfere with the integrity of the data communication between an RFID chip packaged in an antenna module and coupled with an embedded booster antenna, and a contactless reader or terminal.

20 Claims, 6 Drawing Sheets

Chip Module – 6 Contact Pads

PLASTIC CARDS WITH HIGH DENSITY PARTICLES

This application claims priority based on a provisional application titled Metal Powder in Plastic Composite Cards bearing Ser. No. 61/956,588 filed Jun. 12, 2013 whose teachings are incorporated herein by reference.

BACKGROUND OF THE INVENTION

The present invention relates to novel, mostly plastic cards, having a plastic layer which includes high density particles (which may be metal particles or mineral powder) to give the card the feel and weight of a metal card, and methods for their manufacture.

Heavy, metal based, financial transaction cards were introduced in the late 1990's by financial institutions desirous of giving selected customers a sense of wealth and importance. A characteristic of these cards which may be denoted as "prestige" cards is that they weigh between 12 and 15 grams, compared to a standard plastic polyvinyl chloride (PVC) card having a weight of approximately 5.5 grams. The weight of known prestige cards is typically achieved by the addition of a metal layer on, or in, a card body.

Cards made entirely of metal or having a metal plate are known, as shown for example in US 2012/0325914 (Herslow) or US 2011/0189620 (Herslow). Such cards may also include a booster antenna with a coupler coil as shown for example in US 2013/0126622 (2013, Finn). However, these metal cards are very costly to produce and personalize. Also, the use of metals and metal components require materials, processes, and techniques that are not always compatible with systems and equipment used to manufacture plastic cards.

Additionally, the use of metal layers and components in credit cards inherently increases the risks associated with electrostatic discharge into electronic equipment used in credit card transactions, such as point of sale (POS) terminals and ATMs. They also conduct electricity and can contribute to reader terminal failure due to electrostatic discharge.

Another problem with these metalized cards is that it is difficult to have radio-frequency identification (RFD) operation because the metallization interferes with the transmission and reception of radio frequency signals.

An object of the current invention is to produce a card body which can provide the weight and feel of a metal card without the use of a metal layer.

It is another object of the invention to produce a composite card containing metal particles, but which is not electrically conductive to enable RFD functionality without the need for anti-shielding measures to offset the attenuation of the electromagnetic field caused by metal in, or on, a plastic card.

SUMMARY OF THE INVENTION

A plastic card embodying the invention includes a plastic layer which contains high density particles to give the card the feel and weight of a metal card. In accordance with the invention, particles of a "native" or "base" thermoplastic material having a relatively low density (e.g. less than 2 grams/cm$^3$) is compounded with a high density material (e.g., more than 8 grams/cm$^3$) to form a resultant composite material having an "increased" intermediate, density, which is greater than the first density and less than the high density. As used herein and in the claims appended hereto, the terms "resultant composite material" or "compounded composite material" refers to such a material. The resultant or compounded composite material is used to form the core layer, or any selected layer, of a card.

The high density particles may be metal particles or particles from any mineral powder whose density (e.g., more than 8 grams/cm$^3$) is much greater (e.g., at least 4 times) than that of the "base" plastic layer (e.g. less than 2 grams/cm$^3$). Using the resultant composite material of increased density to form the core layer, or any other selected layer, of a card results in an increase in the weight of the card such that the card can have a weight comparable to that obtained with metal cards (e.g., between 12 and 15 grams). In accordance with the invention, the resultant composite material layer (mixture of plastic and high density particles) includes enough particles to increase the weight of cards (e.g., to at least two times the standard PVC card) so a cardholder immediately notices the weight difference. At a minimum, it is desirable that cards embodying the invention have a weight of at least 10 grams since such a weight differential is noticeable to a cardholder.

Such a "heavy" card is highly desirable for the affluent credit card market or for users who want to seem affluent or be in the affluent credit card market.

To more effectively distribute and disperse the high density particles evenly throughout the base plastic material and to achieve uniform separation and distribution of the high density particles, it is desirable that the high density particles be less than 10 microns in size. Also, in accordance with the invention, the amount of high density particle powder mixed with the base plastic is controlled and limited to increase the density of the resultant composite plastic material while retaining the desirable properties of the base plastic material. That is, the resultant composite material remains receptive to the same printing inks, adhesives, and processing conditions even after inclusion of the high density powder. By dispersing a high density powder, such as a metal or a mineral, into a plastic resin, a resultant composite plastic material is formed which can be extruded or calendared to form composite plastic sheets of selected thickness which can be printed and laminated with a printed cover, and/or laminated sheets, into a card structure that can be die-cut and finished in standard plastic card manufacturing equipment.

Note that the resultant composite material tends to be more brittle than the "base" plastic material. However, in accordance with the invention, the amount of powder which is added is controlled to ensure that the brittleness of the composite material is controlled. Furthermore, cards embodying the invention, formed with layers using the resultant composite material, overcome any increased brittleness by sandwiching the resultant composite layers between other plastic layers to provide sufficient durability for financial transaction card use.

Where the high density particles are of a metallic substance, the metallic powder used to increase the density of the "base" plastic layer is comprised of particles that are sufficiently dispersed in the insulative polymer matrix to prevent electrical conductivity. The loading ratio of metal particle fillers to the native plastic is controlled to ensure that the plastic card body is electrically non-conducting. Thus, while the core, or any selected layer, of the card body is loaded with metal particle fillers to provide increased weight, the selected loading level of metal particles to the native plastic is limited to ensure that the electrical insulating properties of the native plastic are maintained; preventing risk of electrostatic discharge during card usage. This significantly reduces the risk of electrostatic discharge when using electronic equipment. By encasing metal particles in a plastic resin matrix when forming a composite card body, the card remains electrically non-conductive, thus preventing electrostatic discharge (ESD). Furthermore, since the card body is electrically non-conductive, RFID functionality can be provided in and to the card and the radio frequency (RF) signal is not attenuated when communicating with a contactless reader or terminal. That is, the resultant composite plastic-metal powder layer does not interfere with RF signal the way a plate of metal would.

In accordance with the invention, plastic credit cards with increased weight may be produced by incorporating one or more layers of a compounded composite material into the core of the card body. In an embodiment, the compounded composite material includes high-density metal particles (preferably less than 10 micron in size) compounded inside a thermoplastic material such as co-polyester (PETg). When metal particles are used to form a layer which is used as the core, or central, layer of a card such layer may be referred to herein as a "metal particle" composite core. The loading level of the metal particles inside the composite increases the density of the composite relative to the native plastic. But, essential attributes of the native plastic are maintained for compatibility with standard card manufacturing processes. These include compatibility with printing inks, adhesives and processing conditions. Cards embodying the invention can be processed on standard card manufacturing equipment without the need for metal working gear.

Furthermore, these cards are cost effective compared to other solid metal alternatives.

In accordance with the invention, a card with a metal particle composite core layer includes a booster antenna integrated on the core layer for inductive coupling with an antenna module which can be implanted into the card body by milling a cavity at the contact card position. A self-bonding insulated copper wire can be ultrasonically embedded into or onto the metal particle composite core in forming a booster antenna with a certain number of turns. When the booster antenna is coupled with the implanted antenna module, the resonant frequency of the system is approximately 13.56 MHz when in an electromagnetic field generated by a reader or terminal.

In an embodiment of the invention, an inductive coupling antenna made of self-bonding insulated copper wire is ultrasonically scribed into or onto the metal particle composite core and routed around the perimeter of the core to form a booster antenna with a coupling section.

In another embodiment of the invention, a card body including a booster antenna and a metal particle composite core can be embossed without damaging the antenna routed around the perimeter of the card body.

In a still further embodiment of the invention, a recess in the composite card body can be milled to accept a six or eight contact antenna module and the loading of metal particle fillers in the plastic card body does not influence the inductive coupling between the coupler section of the booster antenna and the antenna connected to the antenna module which feeds the RFID chip with power for contactless communication.

Thus, the invention also relates to "metal particle plastic composite cards" with RFID (radio frequency identification device) functionality, such as dual interface payment cards, operating in contact mode (ISO 7816-2) and contactless mode (ISO 14443). Such dual interface (DI, or DIF) cards consisting of an antenna module with 6 or 8 contact pads connected with an RFID chip via wire bonds or flip chip assembly, and a booster antenna in the composite card body which inductively couples with the antenna module.

BRIEF DESCRIPTION OF THE DRAWINGS

In the accompanying drawings, which are not drawn to scale, like reference characters denote like components.

FIGS. 4A and 46 are cross-sectional diagrams illustrating that selected plastic layers may be attached to composite core layers to form cards embodying the invention and which overcome brittleness which may be present in a metal particle composite layer;

DETAILED DESCRIPTION

The embodiments shown to illustrate teachings of the invention(s) should be construed as illustrative rather than limiting. Any dimensions and materials or processes set forth herein should be considered to be approximate and exemplary, unless otherwise indicated.

Dual interface cards may be discussed as exemplary of various features and embodiments of the invention(s) disclosed herein. Many features and embodiments may be applicable to (readily incorporated in) other forms of smart cards, such as contact cards and pure contactless cards. As used herein, any one of the terms "dual interface", "contact smart card", "contactless card", and the like, may be interpreted to refer to any other of the devices similar thereto which operate under ISO 14443 or similar RFID standard. The following standards are incorporated in their entirety by reference herein:

ISO/IEC 14443 (Identification cards—Contactless integrated circuit cards—Proximity cards) is an international standard that defines proximity cards used for identification and the transmission protocols for communicating with it.

ISO/IEC 7816 is an international standard related to electronic identification cards with contacts, especially smart cards.

EMV standards define the interaction at the physical, electrical, data and application levels between IC cards and IC card processing devices for financial transactions. There are standards based on ISO/IEC 7816 for contact cards, and standards based on ISO/IEC 14443 for contactless cards.

A typical dual interface card described herein may comprise (i) an antenna module having an RFID chip, (ii) a composite card body and (iii) a booster antenna disposed in the composite card body.

Manufacture of Cards Embodying the Invention

Figure 1:
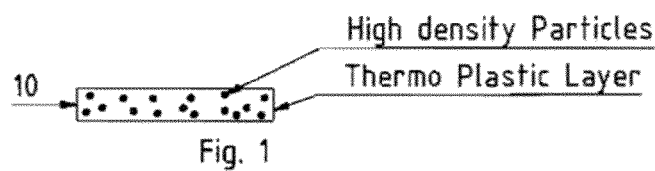
FIG. 1 is a cross-sectional diagram of a thermoplastic layer compounded with high density particles to form a compounded composite layer in accordance with the invention.

Cards embodying the invention include a "base" or "native" thermoplastic material, or any like material, which is compounded (mixed) with micron-sized particles of a high density material, as illustrated in FIG. 1. The high density material may be any metal or mineral of suitable high density. In the discussion to follow it is assumed that the high density particles are metal and metal particles are used by way of example. However, this is by way of example only since clay or ceramic powder of high density may also be used to practice the invention.

The type and amount of metal powder per volume of thermoplastic material is controlled to meet the following criteria: (i) provide a mix of metal powder and thermoplastic material having a predetermined density to obtain the weight desired; (ii) ensure that the resultant mixture retains the properties and characteristics of the base thermoplastic material so it can be processed on "standard" plastic card equipment; and (iii) ensure that the mix is not rendered electrically conductive.

In accordance with one method, the metal powder and the thermoplastic material are pre-weighed and put in a mixing drum and dry mixed usually through tumbling. The mixture can then be put in a device which acts like a bread dough kneader which adds energy to the mix causing it to melt and flow. The mix can be put through an intermediate extruder and made into pellets. In more continuous processes, the mix is sent directly to an extruder, or calendar to be made into a roll or sheet. The roll or sheet can be made to have a wide range of thicknesses.

The "native" or "base" thermoplastic material may be, but is not limited to, a co-polyester such as Polyethylene Terephthalate Glycol (PETG or PETg) or any suitable plastic material including, but not limited to, Polyvinyl chloride (PVC), polyvinyl acetate (PVAc or PVAC), polyethylene terephthalate (PET), amorphous-PET (APET) or crystalline-PET (C-PET), PVAC copolymer, styrenics, Acrylonitrile butadiene styrene (ABS) or Polyethylene (PE) Plastic 1—By way of example, a card may be made using PETG which is a high impact, FDA compliant thermoplastic co-polyester that provides toughness, chemical resistance and fabricates well using processes like die cutting, drilling, routing, bending and polishing without chipping or burs. Due to its low forming temperature, PETG is readily vacuum and pressure-formed, heat bent or it can also be easily bonded using solvents or adhesives. PETG can be screen printed using any number of inks and comes in custom colors to match any scheme.

2—The high density material may be selected from any metal or mineral whose density is greater than that of the thermoplastic material. Typically, the selected high density material should have a density at least four (4) times that of the base thermoplastic material. Examples of high density material suitable for use include, but are not limited to, Tungsten powder, Zinc "dust", iron powder, purified clay, copper, platinum, palladium, gold, and silver.

3—The use of small micron sized particles (preferably less than 10 microns in size) of the selected high density material is beneficial in evenly dispersing and distributing the particles through the plastic to provide better electrical insulation and structural integrity of the finished plastic sheet. A mix of different sizes up to 10 microns is desirable because the smaller particles will "pack" into the spaces around the large particles. But, larger sized particles may also be used to practice the invention.

4—A first selected amount (A) of thermoplastic material is compounded with a second selected amount (B) of high density material powder to increase the specific gravity of the compounded material. Making a mix with a specific gravity of 4.0 or greater was found to be satisfactory. The amount of high density (e.g., metal) particles added to the plastic is controlled to retain the desired physical/mechanical and isolative properties of the plastic. By way of example, a mixture comprised of: (a) 75% by volume of PETG having a specific gravity of 1.42; and (b) 25% by volume of a tungsten powder having a specific gravity of 19.3, produced a resultant composite having a specific gravity of 5.7.

5—The resultant compounded or composite material can then be processed in standard plastic handling equipment and can be extruded or calendared into sheets of desired thickness.

6—As used herein and in the appended claims:
  i—"Density" is equal to mass/volume (can be expressed in $gm/cm^3$);
  ii—"Specific gravity" is equal to the density of the substance divided by the density of water;
  iii—Since the density of water is 1 $gm/cm^3$; the specific gravity of a substance is equal to its density.
  iv—The additional weight of a card made in accordance with the invention will be equal to the volume of the layer (its area times its thickness) of compounded composite material multiplied by its density.

7—A compounded composite layer with metal particles will not be electrically conductive by proper selection of the ratio of the amount of metal particles to the amount of plastic and the particle size of the high density material.

8—The compounded composite material with metal particles can then be processed to form sheets of different thicknesses which in turn can be used to form the core of a card, as illustrated in the figures; or it can be used to form any selected layer of a card.

An example of cards manufactured in accordance with the invention is as follows. A mixture was formed by mixing (blending) Tungsten powder with a co-polyester polymer (PETg) with the amount of Tungsten being 25% of the volume and PETg being 75% of the volume. The Tungsten powder had a specific gravity of 19.3 and included particles sized to be less than 10 microns. The PETg had a specific gravity of approximately 1.34. The compounded composite mixture was a plastic (resin) with a specific gravity of approximately 5.7 which was processed in plastic extruding equipment to produce sheets of material. These sheets made of compounded composite material, having a cross-section, as shown generally in FIG. 1, may be used to make the core of cards embodying the invention, or any layer of such a card.

Figure 2:
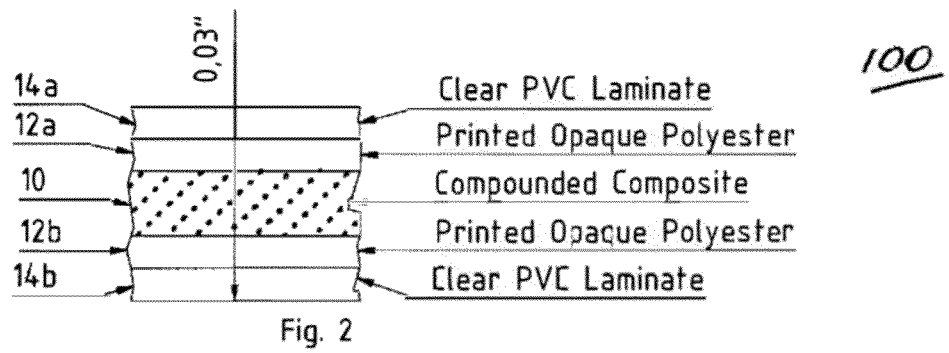
FIG. 2 is a cross-sectional diagram of a card including a compounded composite layer forming the core of a card.
Figure 3:
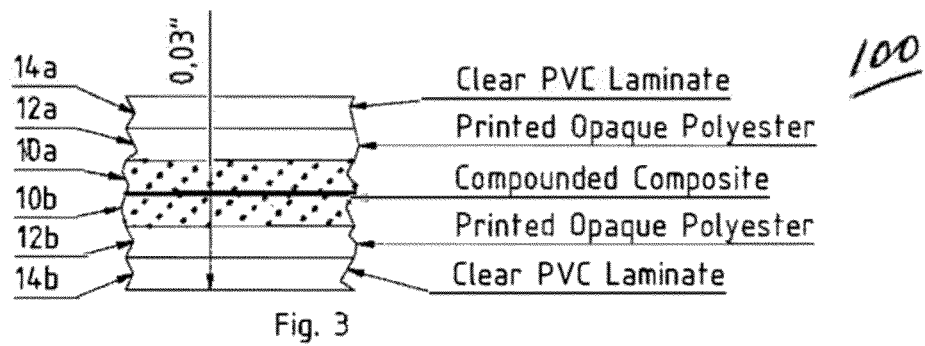
FIG. 3 is a cross-sectional diagram of a card including two compounded composite layers forming the dual core of a card.

FIGS. 2 to 4 are cross sectional views of metal particles composite card stack-up (without booster antenna and antenna chip module) illustrating various sandwich options and choice of materials.

Referring to FIG. 2 there is shown a cross section of a card in which a layer of compounded composite plastic with metal particles, embodying the invention, forms a core 10 of a card 100. A layer 12a may be formed above, and attached to, layer 10; and a layer 12b, similar to layer 12a, may be formed below, and attached to, layer 10. A layer 14a may be formed above, and attached to, layer 12a; and a layer 14b, similar to layer 14a, may be formed below, and attached to, layer 12b. The thickness of core layer 10 may range from 0.008 inches to 0.032 inches. The weight of the card is primarily a function of the density and volume (area and thickness) of the layer 10.

In one embodiment the thickness of layer 10 was selected to be 0.017 inches and the resultant weight of the card (including the other layers) was 11.5 grams.

The thickness of layers 12a and 12b may range from 0.003 inches to 0.010 inches. The thickness of layers 14a and 14b may range from 0.001 to 0.005 inches. Layers 12a and 12b may be any plastic material such as PVC, PVAC, PETG, Styrene, Composite PVC and PET and may be printed. Layers 14a and 14b may be any suitable plastic material such as, for example, PVC, PVAC, PETG and may be clear. A sandwich may be formed of the various layers shown in FIG. 2 and they be may be laminated in one step using standard plastic card handling techniques. Alternatively, layers 12a and 12b may first be laminated with, and to, core layer 10 to form a sub-assembly. Then layers 14a and 14b may be laminated to the sub-assembly to form a card. Layers 12a and 12b may include printed information formed on these layers before attachment to the core or after attachment to the core and they may be opaque or clear. Layers 14a and 14b may be clear PVC laminate. Layer 10 is shown to be a core layer but the compounded composite layer could be used to form any other layer in the formation of a card.

The total weight of the card is primarily a function of the density and thickness of the layer 10. As noted above, compounded composite core layer 10 has a predetermined density to make a card 100 such that (1) it has a desired weight (e.g., more than 10 grams); (2) it retains the properties and characteristics of the base thermoplastic material so it can be processed on "standard" plastic card equipment; and (3) it is electrically non-conductive.

Referring to FIG. 3 there is shown a cross section of a card which is similar to that of FIG. 2 except that there is a split core comprised of two compounded composite layers 10 attached to each other. The use of two core layers (10a, 10b) is done to increase the weight of the card. Here again the compounded composite layers (10a, 10b) can be processed and attached to each other and to other plastic layers using standard plastic card handling techniques. Layers 12a, 12b and layers 14a and 14b are similar to the like numbered layers shown in FIG. 2, except for their thickness.

Figure 4A:
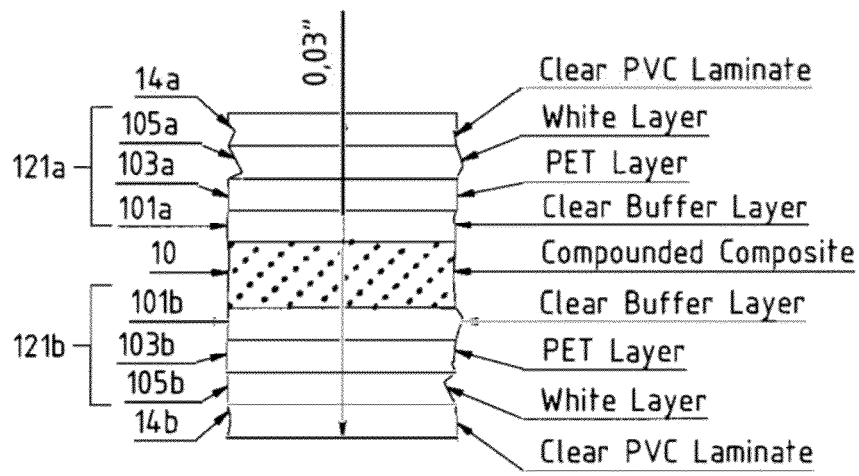
Figure 4B:
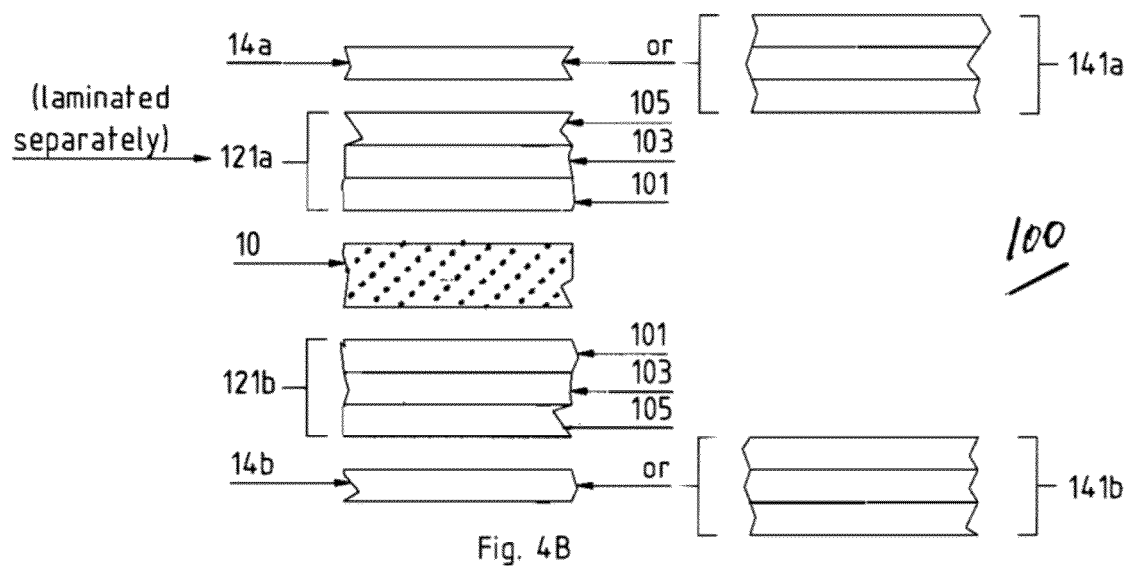

FIGS. 4A and 4B shows a core layer 10 comprised of a thermoplastic layer which has been compounded with particles of a high density material to form a composite layer embodying the invention.

In FIG. 4A a clear buffer layer 101a is formed and attached above the core layer 10 and a corresponding clear buffer layer 101b is formed and attached below the core layer. A PET layer 103a is formed above layer 101a and a corresponding PET layer 103b is formed below layer 101b. A white layer 105a is formed above layer 103a and a corresponding white layer 105b is formed below layer 103b. A clear PVC laminate 14a is formed and attached above layer 105a and a like clear PVC laminate 14b is formed and attached below layer 105b. Thus, a symmetrical sandwich is shown formed above and below core layer 10.

A card formed as shown in FIG. 4A compensates for any brittleness introduced in the compounded composite layer. Sandwiching the compounded composite layers as shown in FIGS. 2, 3 4A and 4B with stronger materials such as polyester (e.g., PET) or polyester composites (e.g., PET) adds strength to the compounded composite layer and overcomes the brittleness present in fully loaded metal composite to provide sufficient durability for financial transaction card use.

The layers 101a, 103a, 105a can be laminated to form a subassembly 121a and the layers 101b, 103b, 105b can be laminated to form a subassembly 121b. The subassemblies 121a and 121b can then be attached above and below a core layer 10 to form a card. Thus, each separate layer can be sandwiched with a core layer and the whole assembly can be laminated at once, as shown in FIG. 4A. Alternatively, as shown in FIG. 4B subassemblies 121a, 121b can be formed separately and then laminated onto and with the core layer. The significant point is that the compounded composite metal particle layer can be processed or attached to other layers to form a card in a more optimum manner than when metal layers are used. FIG. 4b also illustrates that layers 14a and 14b could be replaced by multiple layers 141a, 141b of selected plastic materials.

Features and Benefits of Cards Embodying the Invention Obtained by Replacing a Metal Layer with "Heavy" (Non-Conductive) Plastic Layer Include:

1—Cards embodying the invention can be processed on standard card manufacturing equipment without need for metal working gear. In contrast the manufacture of metal cards requires milling machines, lathes, sand blasting equipment, spray booths and a host of other specific equipment 2—Cards with a compounded composite layer combine enough powder (particles) to increase the weight to at least 2 times the standard PVC card so a cardholder immediately notices the weight difference. Cards of this invention can be made with the same outward appearance as a standard PVC card but be many times heavier giving the user the feel of elegance.

3—Sandwiching the compounded composite layers containing high density particles, as shown in FIGS. 2, 3, 4A and 4B, with stronger materials such as polyester or polyester composites overcomes the brittleness present in fully loaded metal composite to provide sufficient durability for financial transaction card use.

4—The heavy composite layer using high density metal particles contains enough high density particles to increase the weight significantly but not so much that it is electrically conductive or degradation of structural integrity below a point where it will lose Z axis strength or lose its ability to be extruded or calendared or the ability to be processed using standard plastic sheet processing equipment.

5—Furthermore, these cards are cost effective compared to other solid metal alternatives.

6—The amount/volume of the metal particles (or mineral powder) to the amount/volume of the base plastic is controlled so the card:

i—is not electrically conductive, and is reasonably transparent to RF signals so the compounded composite metal particle powder layer does not interfere with RF signal the way a plate of metal would;

ii—is not subject to electrostatic discharge properties; and iii—can be manufactured on standard current plastic card equipment and tooling.

7. The card can be overprinted, embossed, and the embossing will meet or exceed ISO 7810 embossing height and embossing height retention minimum standards.

8. The card can be provided with further components such as holograms, signature panels, magnetic stripes, antennas, contact chips or card company identifiers.

9. The edge of these cards has a metallic look.

In FIGS. 5A, 5B, 6, 6A, and 6B it is assumed that the compounded composite layer 10 is used to form the core of the card and that the core is a compounded composite layer formed with metal particles; hence, the reference in the figures to "metal particle composite core". FIGS. 5A, 5B, 6, 6A, and 6B illustrate that RFID capability can be readily added to cards embodying the invention because the compounded composite layer with metal particles is not electrically conductive and can be processed like any standard plastic (e.g., PVC) layer. As shown in these figures, the cards may be standard size cards (i.e., the length width and thickness of the cards conform to the ISO standards), as shown, for example, in FIG. 6B. The desired weight of the card is obtained by: (a) controlling the density of the particles compounded into the thermoplastic layer; and (b) the thickness of that layer since the length and width of the card layer is standard.

Figure 5A:
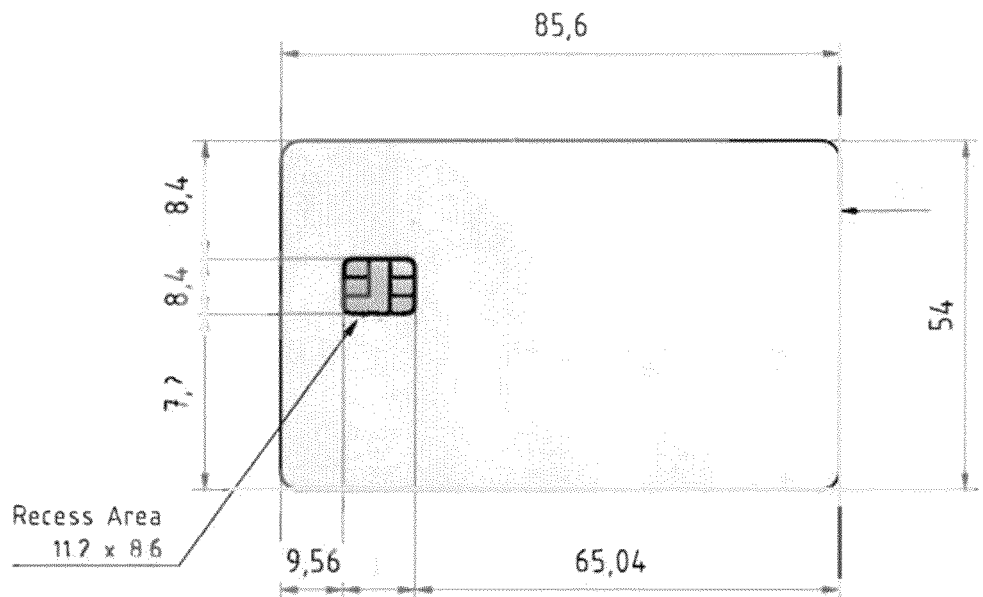
FIG. 5A is a plan view of an upper printed layer to be attached to a core layer which can accommodate a 6 contact pad chip module to be mounted therein.
Figure 5B:
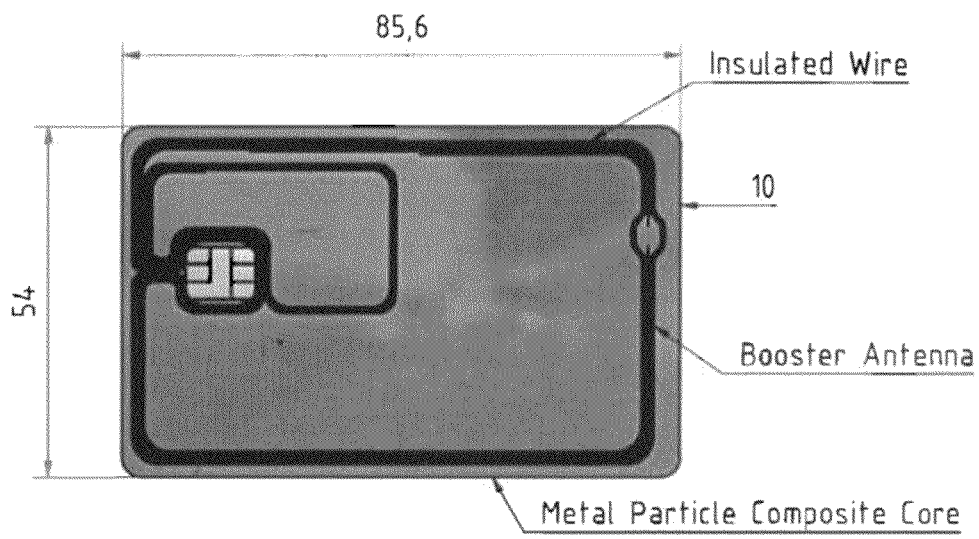
FIG. 5B is a plan view of a compounded composite core layer embodying the invention designed to receive a chip module and with a booster antenna attached to the composite core layer.

FIG. 5A shows a layer 12a with a recessed area to accept a module with the layer 12a designed to be mounted on, and attached to, a metal particle composite layer 10 with a booster antenna formed thereon as shown in FIG. 56.

FIG. 56 shows a metal particle compounded composite layer 10 having a top surface on which is formed a booster antenna coupled to a chip module having 6 contact pads. The number of 6 contact pads is by way of example and a chip module with more than 6 contact pads (e.g., 8 or more) is within is also intended for use in cards embodying the invention. Insulated wiring is used to avoid shorting the wires when they cross over each other.

Figure 6:
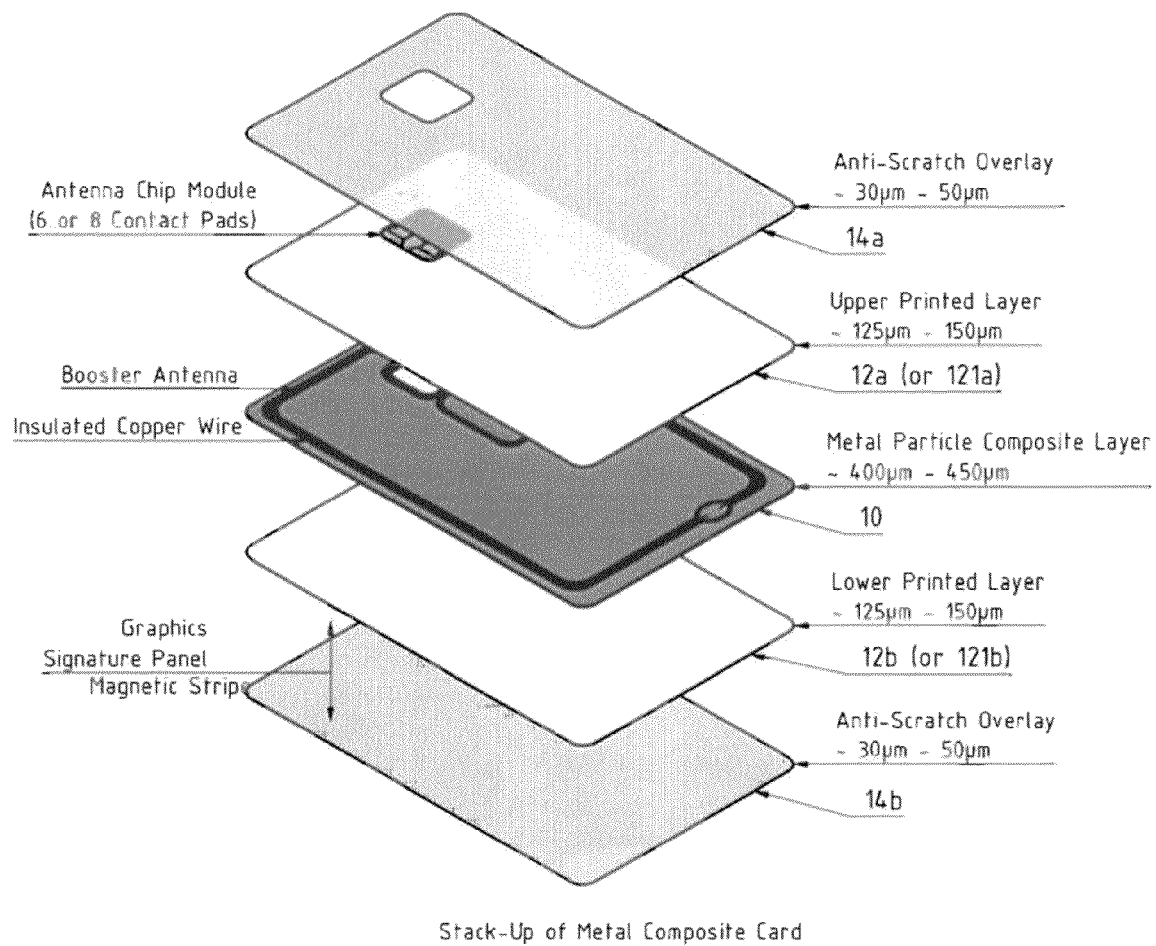
FIG. 6 is a perspective view of a stack of layers including a compounded composite core layer embodying the invention used to form a card with RFID capability, in accordance with the invention.

FIG. 6 shows the stacking of layers to form a card embodying the invention. A core layer 10, such as the one shown in FIG. 5B has a layer 12a (or a subassembly 121a) attached to the top surface of the core layer and a layer 12b (or a subassembly 121b) attached to the bottom surface of the core layer. An anti-scratch overlay 14a is attached to the top surface of layer 12a (or of subassembly 121a) and a corresponding anti-scratch overlay 14b is attached to the bottom surface of layer 12b (or of subassembly 121b). The layers shown in FIG. 6 may be assembled stacked on top of each other and then laminated. Note that layers 10 and 12a (or 121a) may be designed, by way of example, to accept 6 or 8 (or more) contact pads.

Figure 6A:
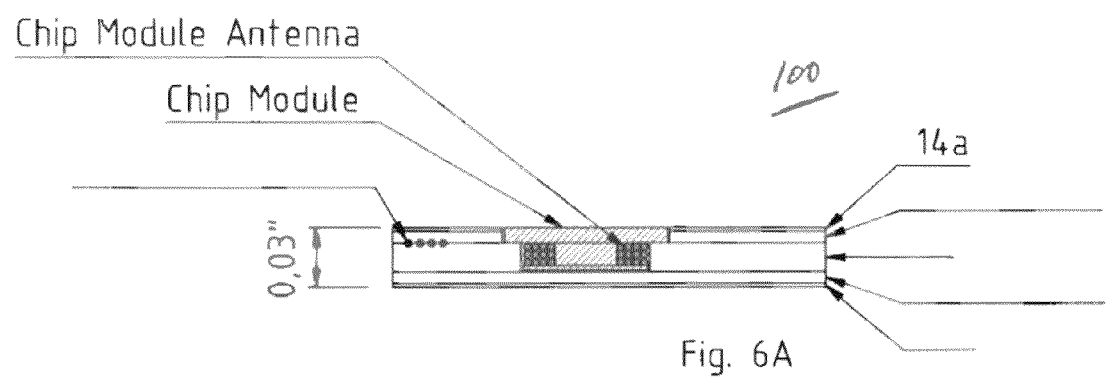
FIG. 6A is a highly simplified cross sectional view of the card of FIG. 6 with the layers attached to each other after undergoing lamination.

FIG. 6A is a highly simplified cross sectional view of the card of FIG. 6 showing the layers attached to each other after undergoing lamination. Note that the chip module passes through layer 12a (or 121a) and extends within compounded composite layer 10. Layers 14a and 14b which may be composite layers are mounted in a symmetrical way about the core and the other layers. The compounded composite core layer 10 is milled to accept a chip module and a chip module antenna. A booster antenna is attached to a surface of the core layer 10. The metal particles in the composite core do not affect the inductive coupling between the booster antenna and the chip module antenna connected to the chip module which feeds the chip module with power for contactless communication.

Figure 6B:
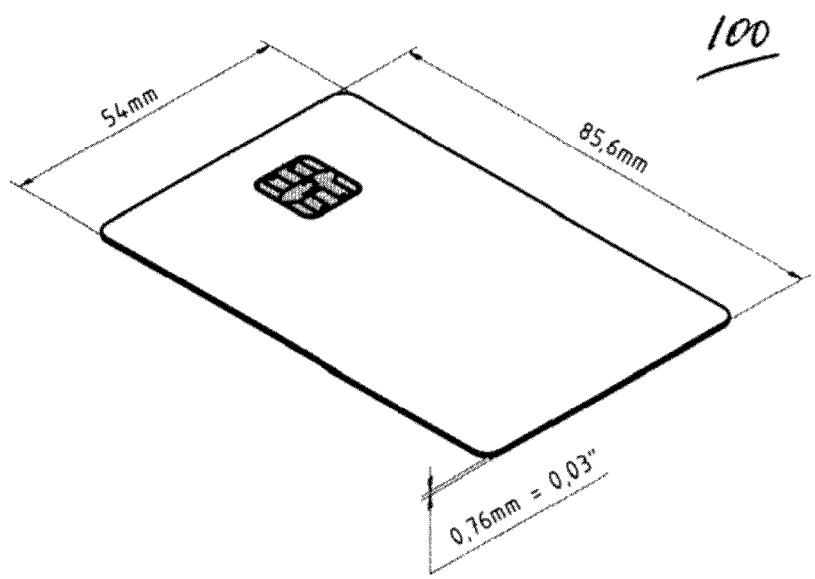
FIG. 6B is a perspective view of a card formed in accordance with the invention showing the card meets the dimensions of a standard plastic card.

FIG. 6B is a perspective view of the card 100 formed in accordance with the invention showing the card meets the dimensions of a standard plastic card.

The reactive coupling system in a dual interface card operates on the principle that an antenna chip module having six or eight contact pads on the face upside with vertical interconnects (vias) to the face down side, and an antenna structure or coil mounted on and bonded to the face down side are interconnected to an RFID chip (silicon die) through wire bonds or flip chip assembly, and the antenna structure or coil draws energy for the RFID chip by inductively coupling with a booster antenna within the card body when in an electromagnetic field generated by a reader.

The booster antenna with a coupling section for interfacing with the antenna chip module is routed around the perimeter of the card body. The antenna connected to the RFID chip is a resistive, capacitive and inductive (RCL) circuit. The Q factor of the circuit is dependent on the resistance of the antenna circuit, load resistance of the chip, the input capacitance of the chip, the spacing between the traces of the antenna structure or distance between the turns of insulated wire in the coil, and the number of turns which make up the inductive component. The resonant frequency of the circuit is approximately 13.56 MHz matching the carrier frequency generated by the RFID reader.

The booster antenna is not physically connected to the antenna chip module, but rather draws energy from the electromagnetic field generated by the reader or terminal and concentrates this energy around the coupling section of the booster antenna which in turn inductively couples with the antenna chip module to activate the RFID chip. The booster antenna is designed as a dipole with two antennas starting and ending at opposing positions. The benefit of this construction is the significant reduction in the number of turns needed to drive the antenna chip module. This allows for the booster antenna to be routed around the perimeter of the card body below the 5th line of the embossing area.

The performance of the booster antenna is dependent on the loading of the antenna chip module, the distance between the coupling section of the booster antenna and the antenna chip module, spacing between the turns of insulated copper wire which regulates the capacitance and the number of turns in each of the antennas which make up the dipole.

Self-bonding insulated copper wire is used to create the booster antenna with coupling section. The self-bonding layer of the copper wire is a polyurethane adhesive which softens by the application of heat through friction. The insulation layer prevents short circuits at crossover points along the antennas and eliminates electrostatic discharge in handling the finished card in general use.

Self-bonding insulated copper wire is ultrasonically scribed onto or embedded into a metal particle composite substrate to create a booster antenna with a given number of turns at a site position in a production array. The wire diameter is approximately 112 microns.

Typically, six or eight ultrasonic embedding heads on a gantry are used to produce six or eight booster antenna sites simultaneously, with the gantry or the metal composite substrate moving a step to allow the next series of antenna sites to be produced. In this way, an array of booster antenna sites on a metal composite substrate can be produced.

To countersink the array of antennas into the metal composite substrate, a prepress in a lamination press may be required. After prepress, the metal particle composite substrate with booster antennas is laminated with an additional synthetic layer or layers to produce a pre-laminate, for further processing by a card manufacturer. The synthetic layer protecting the booster antennas may have fiducial markings or index holes to facilitate alignment with the upper and lower printed sheets produced by the card manufacturer.

The pre-laminate is an array of card body sites which matches the format of the card manufacturer's printing press.

At the card manufacturer, the pre-laminate with a booster antenna at each site in the array, is further laminated with an anti-scratch overlay layer, an upper printed layer, a lower printed layer and a lower anti-scratch overlay layer or magnetic stripe layer. Typical dimensions of the card body stack-up are as follows: the pre-laminate (metal composite core) with an approximate thickness of 400-450 microns, an anti-scratch overlay layer of 30-50 microns, an upper printed layer of 125 to 150 microns, a lower printed layer of 125 to 150 microns and lower anti-scratch overlay layer or magnetic stripe layer of 50 microns. The sandwich is laminated and each position in the array is punched to produce a card body.

What is claimed is:

1. A card having a layer which includes a base layer of thermo plastic material having a first density, D1, into which is compounded particles of a high density material having a second density, D2, where D2 is at least four times the density of D1; said high density particles of density D2 being sized to be equal to or less than 10 microns in size; and wherein the amount of said high density particles compounded within the thermoplastic material is controlled to produce a compounded composite thermoplastic layer having a third density, D3, which is at least twice D1; and wherein the volume of said compounded composite thermoplastic layer is set so the card has a weight of at least 10 grams.

2. The card as claimed in claim 1 wherein the high density material is a metal, and wherein the amount of high density particles compounded into the thermoplastic layer is controlled to ensure that the compounded composite thermoplastic layer is electrically non-conductive.

3. The card as claimed in claim 1 wherein said first density D1 is less than 2 grams per cubic centimeter and wherein the particles of the high density material of density D2 are selected to be from a metal, or a ceramic, or any substance having a density which is at least four times greater than D1.

4. The card as claimed in claim 1 wherein the base layer of thermoplastic material is a thermoplastic material including, but not limited to, a co-polyester such as Polyethylene Terephthalate Glycol (PETG or PETg), a Polyvinyl chloride (PVC), a polyvinyl acetate (PVAC), a polyethylene terephthlalate (PET), amorphous-PET (APET), a crystalline-PET (C-PET), a PVAC copolymer, styrenics, Acrylonitrile butadiene styrene (ABS) or Polyethylene (PE) Plastic.

5. The card as claimed in claim 1 wherein the size of the high density particles of second density D2 may range from less than a micron to less than 10 microns.

6. The card as claimed in claim 1 wherein the compounded composite thermoplastic layer forms the central layer of the card, defined as the core of the card layer; said central layer having a top surface and a bottom surface; and further including additional plastic layers attached to the top and bottom surfaces of the thermoplastic layer.

7. The card as claimed in claim 6 wherein first and second additional layers are formed above the top surface of the central layer and third and fourth additional layers are formed below the bottom surface of the central layer.

8. The card as claimed in claim 1 wherein the compounded composite thermo plastic layer forms the central layer of the card, defined as the core of the card; said central layer having a top surface and a bottom surface; and wherein a chip module is attached to a surface of the central layer and an antenna is disposed along a surface of the central layer and is coupled to the chip module for enabling radio frequency identification (RFID) communication.

9. The card as claimed in claim 8 wherein first and second additional layers are formed above the top surface of the central layer and third and fourth additional layers are formed below the bottom surface of the central layer.

10. A method of making a card comprising the steps of:
selecting particles of a high density material of second density, D2, including the step of selecting the size of the high density particles to be less than 10 microns;
mixing a predetermined amount of a thermoplastic material having a predetermined first density, D1, with a selected amount of said particles of a high density material having a density D2, where D2 is at least 4 times D1 to produce a compounded composite mixture having a third density, D3, which is at least twice that of D1; and
processing the compounded composite mixture to produce a layer of the compounded composite mixture having a predetermined thickness; and
using the layer of the compounded composite mixture for making a card which weighs at least 10 grams.

11. A method of making a card as claimed in claim 10, wherein the step of using the layer of the compounded composite material for making a card includes the step of attaching additional layers of selected plastic materials to the layer of the compounded composite mixture.

12. A method as claimed in claim 11 wherein said high density material is any metal or mineral powder.

13. A method as claimed in claim 11 wherein the thermoplastic material is a thermoplastic material including, but not limited to, a co-polyester such as Polyethylene Terephthalate Glycol (PETG or PETg), a Polyvinyl chloride (PVC), a polyvinyl acetate (PVAC), a polyethylene terephthlalate (PET), amorphous-PET (APET), a crystalline-PET (C-PET), a PVAC copolymer, styrenics, Acrylonitrile butadiene styrene (ABS) or Polyethylene (PE) Plastic 14. A method as claimed in claim 11 including the step of controlling the amount of thermoplastic material mixed with a select amount of particles to ensure that the specific gravity of the compounded composite mixture is equal to or greater than 4.

15. A method as claimed in claim 11 wherein the high density particles are metal particles and further including the step of controlling the amount of thermoplastic material mixed with the selected amount of particles to ensure that the resultant compounded composite mixture is electrically non-conductive.

16. A method as claimed in claim 15 wherein the layer of the compounded composite mixture is used to form the core layer of said card and wherein a first layer of selected plastic material is attached above the core layer and a second layer of selected plastic material is attached below the core layer.

17. A method as claimed in claim 16 wherein a chip module and an antenna chip module are implanted into a recess in the card body, and wherein a booster antenna is attached to the compounded composite core which inductively couples with the antenna chip module.

18. A method as claimed in claim 16 wherein the amount of metal particles compounded into the base plastic layer to form the core of a composite card body is chosen such that the core and card body are electrically non-conductive; and further including the placing of a chip module and an antenna within the card to enable the card to include RFID functionality.

19. A method as claimed in claim 16 wherein said card formed with a compounded composite core is milled to accept a chip module and a chip module antenna and also a booster antenna; and wherein the metal particles in the composite core do not affect the inductive coupling between the booster antenna and the chip module antenna connected to the chip module.

20. A method of making a card as claimed in claim 10, wherein the step of mixing a predetermined amount of a thermoplastic material with a selected amount of particles of a high density material increases the brittleness of the compounded composite mixture; and wherein the step of using the layer of the compounded composite material for making a card includes the step of attaching additional layers of selected plastic materials to the layer of the compounded composite mixture to compensate for the increased brittleness of the compounded composite mixture.

* * * * *